United States Patent [19]

Just et al.

[11] Patent Number: 4,832,150

[45] Date of Patent: May 23, 1989

[54] SOUND-PERMEABLE COVER FOR A LOUDSPEAKER

[76] Inventors: Gunter Just, Schuppengasse 13, A-1230 Wien; Erich Stastny, Parkstrasse 9, A-2521 Trumau, both of Austria

[21] Appl. No.: 76,303

[22] Filed: Jul. 22, 1987

[30] Foreign Application Priority Data

Jul. 28, 1986 [AT] Austria ................................ 2024/86

[51] Int. Cl.⁴ ............................................ G10K 11/00
[52] U.S. Cl. .................................... 181/175; 181/150; 181/199
[58] Field of Search ............... 181/148, 150, 153, 175, 181/199, 157, 151, 242

[56] References Cited

U.S. PATENT DOCUMENTS

| | | | |
|---|---|---|---|
| 2,106,813 | 2/1938 | Romanow | 181/242 X |
| 3,666,040 | 5/1972 | Junk | 181/150 |
| 3,666,610 | 5/1972 | Rosen | 181/157 X |
| 3,941,638 | 3/1976 | Horky et al. | 181/199 X |

*Primary Examiner*—B. R. Fuller
*Attorney, Agent, or Firm*—Remy J. VanOphem

[57] ABSTRACT

A sound-permeable loudspeaker cover including a frame in which are arranged mutually crossing webs of a synthetic plastic material delimiting sound passage openings. A sound-permeable material, for instance a fleece, a textile fabric or a knitting, covers the sound passage openings, and is arranged approximately in the middle of the webs. The webs are produced as a single part according to the injection molding process, and penetrate the sound-permeable material to anchor it at a plurality of individual locations.

6 Claims, 2 Drawing Sheets

SOUND-PERMEABLE COVER FOR A LOUDSPEAKER

BACKGROUND OF THE INVENTION

1. Field of the Invention

The invention refers to a sound permeable loudspeaker cover having a frame in which are arranged mutually crossing rods of a synthetic plastic material and delimiting sound passage openings and further having a sound-permeable material covering the sound passage openings.

2. Description of the Prior Art

It is known to cover the cone of loud-speakers by a loud-speaker cover having the shape of a lattice, allowing the passage of sound but preventing the loudspeaker cone from becoming mechanically damaged. It is also known to produce the webs delimiting the sound passage openings from synthetic plastic material according to an injection molding process.

If loudspeaker are arranged in a position in which the loudspeaker cover extends essentially along a horizontal plane, as is for example the case when mounting loudspeakers in the tail turret of motor vehicles, there exists the risk that dirt particles, foreign bodies or the like fall through the sound passage openings of the loudspeaker cover into the conically shaped diaphragm of the loudspeaker and thus give rise to at least a distortion of the sound reproduced by the loudspeaker. Pointed objects falling through the lattice openings may even cause damage to the speaker cone.

For the purpose of avoiding this drawback, it has already been proposed to additionally cover the sound passage openings by a sheet of a sound-permeable material, which sheet is, for example, fixed to the loudspeaker cover by glueing to that side of the loudspeaker cover which faces the speaker cone. In this known arrangement, there exists the risk that the sound-permeable material becomes, particularly when having been applied in an improper manner, at least partially loosened from the webs, so that the particles retained by this sound-permeable material fall into the speaker cone.

In order to overcome this drawback, there has already been proposed a loudspeaker cover consisting of two independently produced lattices formed of webs and having clamped therebetween a plurality of layers consisting of a mesh of synthetic plastic material, noting that both lattices are held together by means of a screw. It is a drawback of this known construction that both lattices must separately be produced and that there exists the risk that the screw becomes, in particular on account of the vibrations generated during operation of the loudspeaker, loosened or even completely unscrewed, so that in case of an approximately horizontal arrangement of the loudspeaker cover particles may again fall into the speaker cone or strays, resonance phenomena or the like may at least occur on account of the loose connection of both lattices.

A loudspeaker cover consisting only of sheets of fabric being clamped between two frames connected one with the other is also known. In this known loudspeaker cover having no webs crossing one or the other, there exists the risk that the fabric sheets may become damaged, for example perforated, particularly in those cases in which the loudspeakers are arranged in the tail turret of motor vehicles and heavy or sharp-edged objects are put into this tail turret.

It is an object of the present invention to provide a loudspeaker cover which can be produced in a simple manner and which reliably prevents foreign bodies from penetrating into the speaker cone even in case of a substantially horizontal arrangement of the cover.

It is a further object of the present invention to provide a loudspeaker cover in which an inseparable connection is warranted between the webs delimiting the sound passage openings and the sound-permeable synthetic plastic material.

Furthermore, it is an object of the present invention to provide a process allowing manufacture of a loudspeaker cover in a simple and money-saving manner.

DETAILED DESCRIPTION OF THE PREFERRED EMBODIMENT

Figure 1:
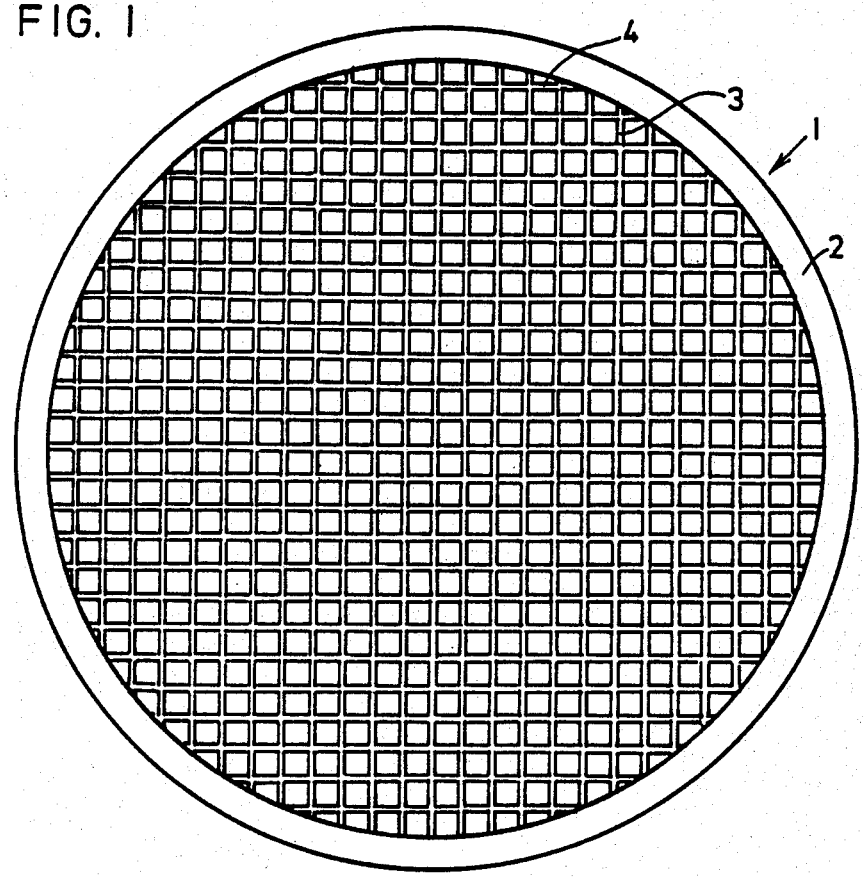
FIG. 1 shows a plan view of a loudspeaker cover according to the invention.
Figure 2:
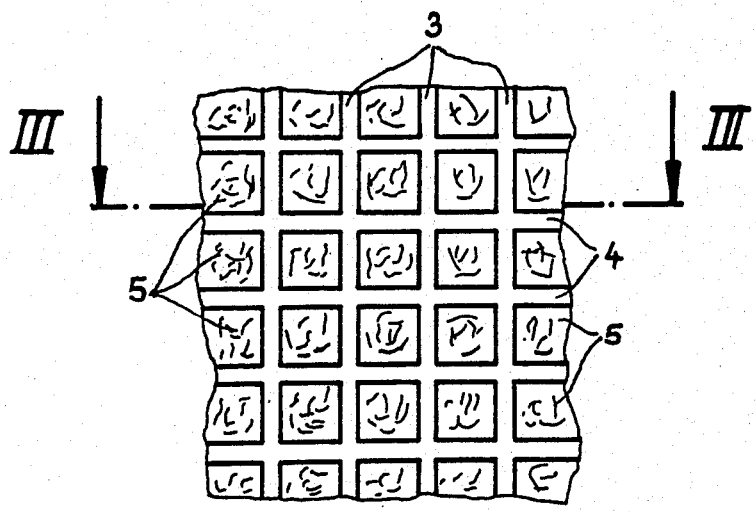
FIG. 2 shows a detail view of the loudspeaker cover of FIG. 1 in a larger scale.

A loudspeaker cover according to the invention is generally indicated by 1 in FIG. 1. This loudspeaker cover has a frame 2 in which are arranged mutually crossing webs 3, 4. The frame 2 and the mutually crossing webs are formed as an integral part from injection-molded synthetic plastic material. The webs 3, 4 delimit sound passage openings 5, as shown particularly in FIG. 2.

In the embodiment shown in FIG. 1, the webs 3, 4 extend along straight lines, but these webs may also have another shape. For example, the webs 3 may have the shape of circles arranged concentrically to a circular frame, whereas the webs 4 extend in the radial direction. Furthermore, the loudspeaker cover is of plane shape in the embodiment shown, but can also be vaulted. Finally, the frame 2 may have another shape than the shape of a circle, for example, the frame may have the shape of a square or, respectively, a rectangle or another polygonal shape, particularly in the case of a combination of several loudspeakers covered by one single cover.

Figure 3:
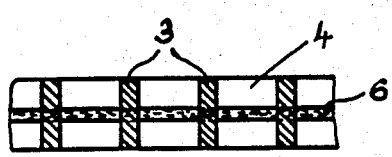
FIG. 3 shows a sectional view along line III—III in FIG. 2.

As can in particular be understood from FIG. 3, a sheet 6 of a sound-permeable material, for example fleece, a fabric or a knitting, is located approximately in the middle of the webs 3, 4. This sheet may consist of natural fibers or of synthetic fibers or of a mixture of natural fibers and synthetic fibers. The sheet 6 is penetrated by the synthetic plastic material forming an anchorage at those locations where the webs 3, 4 are located. Thus, there results a reliable anchoring of the sound-permeable material 6 within the area of the webs 3, 4.

Figure 4:
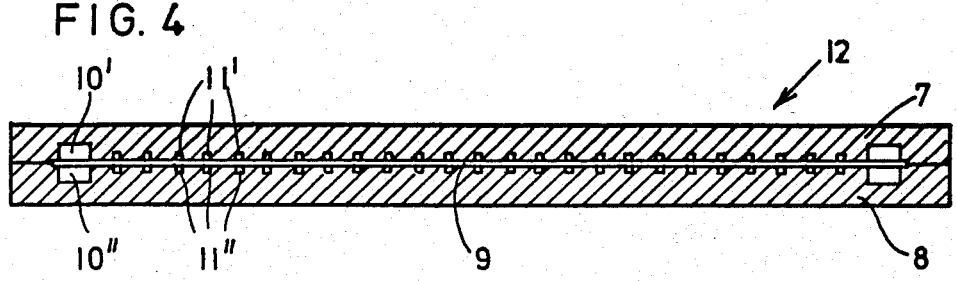
FIG. 4 shows a sectional view of a mold for injection molding and for producing the loudspeaker cover according to the present invention.

In FIG. 4 there is shown in cross section an injection molding die, generally indicated by 12, for producing a loudspeaker cover according to the invention. This injection molding die 12 consists of two parts 7, 8, which can be connected one with the other in a pressure-tight manner as known per se in the art, but not shown in detail. Within the area of the separating surface therebetween, there are located in each of both parts 7, 8 corresponding recesses 9 for receiving a sheet of sound-permeable material, which sheet is clamped at the edge of the injection molding die 12 after having closed same. Furthermore, circumferentially extending grooves 10', 10" for forming the frame and grooves 11', 11" arranged in a criss-cross pattern and for forming the webs are located in both parts 7, 8 within the area of the separating surface therebetween in mutual alignment, only those grooves 11', 11" extending in one direction being shown in FIG. 4.

At least one opening (not shown) for injecting the synthetic plastic material and at least one opening (not shown) for venting the air present within the die cavity are provided in at least one of both parts 7, 8.

Production of the loudspeaker cover according to the invention is effected by first placing into the opened injection molding die 12 the sheet 6 of sound-permeable material, which is fixed in location within this injection molding die after having closed the die, i.e. after having connected both form halves 7, 8 one with the other. Subsequently, the synthetic plastic material is injected into the die cavity via the openings (not shown) for filling the grooves 10', 10" and 11', 11", whereby the frame 2 and the webs 3, 4 are formed. The injection procedure is performed such that the injected synthetic plastic material at least partially penetrates through the sound-permeable material, so that an inseparable connection is produced between the sheet and the webs.

What is claimed is:

1. A sound-permeable loudspeaker cover, comprising:
    a frame having a plurality of webs made of a synthetic plastic material, each of said plurality of webs having a terminus surface at one end thereof and an opposing surface at an opposite end thereof, said plurality of webs delimiting sound passage openings; and
    a sound-permeable cloth material mounted to said frame covering said sound passage openings, said sound-permeable cloth material further positioned between said terminus surface and said opposing surface of each of said plurality of webs to define an interstitial relationship with each of said plurality of webs, such that said plurality of webs engrosses said sound-permeable cloth material to hold said sound-permeable cloth material to said frame at a plurality of individual locations.

2. The loudspeaker cover as claimed in claim 1 wherein said sound-permeable material is located substantially mid-way between said terminus surface and said opposite surface of each first and second sides of said plurality of webs.

3. The loudspeaker cover as claimed in claim 1, wherein said sound-permeable material comprises a fleece.

4. The loudspeaker cover as claimed in claim 1, wherein said sound-permeable material comprises a textile fabric.

5. The loudspeaker cover as claimed in claim 1, wherein said sound-permeable material comprises a knitting.

6. The loudspeaker cover as claimed in claim 1, wherein each of said plurality of webs are formed by an injection molding process.

* * * * *

UNITED STATES PATENT AND TRADEMARK OFFICE
CERTIFICATE OF CORRECTION

PATENT NO.   : 4,832,150

DATED        : May 23, 1989

INVENTOR(S)  : Stastny et al

It is certified that error appears in the above-identified patent and that said Letters Patent is hereby corrected as shown below:

Column 1, line 14, delete "loud-speakers" and insert ---- loudspeakers ----.

Column 1, line 15, delete "loud-speaker" and insert ---- loudspeaker ----.

Column 1, line 21, delete "loudspeaker" and insert ---- loudspeakers ----.

Column 2, line 17, delete "." and insert ---- ; ----.

Signed and Sealed this

Second Day of October, 1990

*Attest:*

HARRY F. MANBECK, JR.

*Attesting Officer*       *Commissioner of Patents and Trademarks*